(12) United States Patent
Momoi et al.

(10) Patent No.: US 6,385,010 B1
(45) Date of Patent: May 7, 2002

(54) CARTRIDGE

(75) Inventors: Akio Momoi; Kenji Hashizume; Shinichi Sato, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/566,021

(22) Filed: May 8, 2000

(30) Foreign Application Priority Data

May 12, 1999 (JP) .......................................... 11-131432

(51) Int. Cl.⁷ .............................................. G11B 23/02
(52) U.S. Cl. ...................................................... 360/132
(58) Field of Search ................... 360/132, 133; 369/291

(56) References Cited

U.S. PATENT DOCUMENTS 4,371,286 A    2/1983   Okamura et al. ........... 403/407
5,797,555 A    8/1998   Shima et al. ................ 242/347
6,191,920 B1 * 2/2001   Kashizume et al. ........ 360/132

FOREIGN PATENT DOCUMENTS

| JP | 61-2805   |   | 1/1986  |         |
|----|-----------|---|---------|---------|
| JP | 1-133275  | * | 5/1989  | 360/132 |
| JP | 2-123772  |   | 10/1990 |         |
| JP | 5-114270  | * | 5/1993  | 360/132 |
| JP | 6-243635  | * | 9/1994  | 360/132 |
| JP | 10-144041 |   | 5/1998  |         |

* cited by examiner

Primary Examiner—Allen Cao
(74) Attorney, Agent, or Firm—Marshall, Gerstein & Borun

(57) ABSTRACT

A cartridge including a housing which holds a tape medium or disk medium and which is composed of upper and lower casings. The two casings are joined with screws in bosses formed at their four corners. The cartridge is characterized in that the bosses in at least one of the upper and lower casings have ends with partially different heights each so that, when the upper and lower casings are joined, their bosses come in contact with one another before the sidewalls of the in casings are mated.

8 Claims, 5 Drawing Sheets

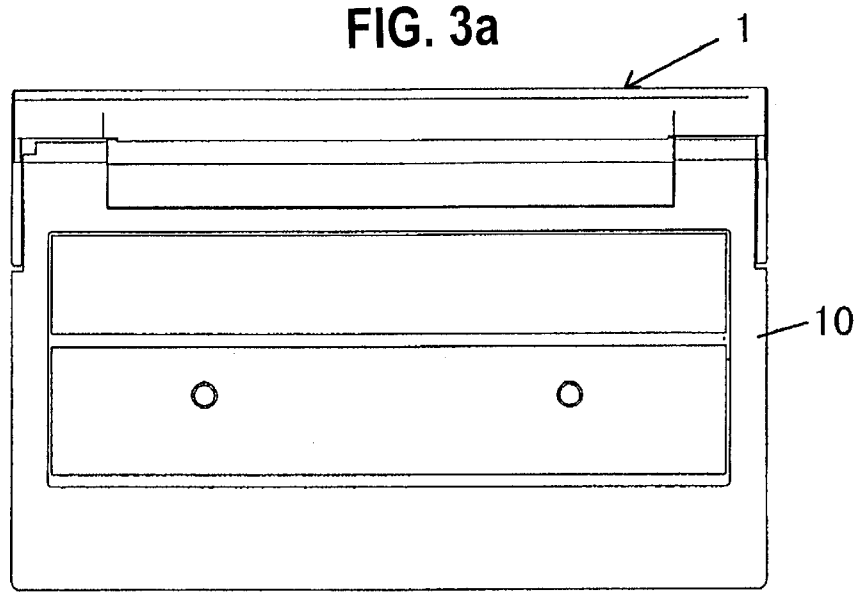
FIG. 3c
FIG. 3a
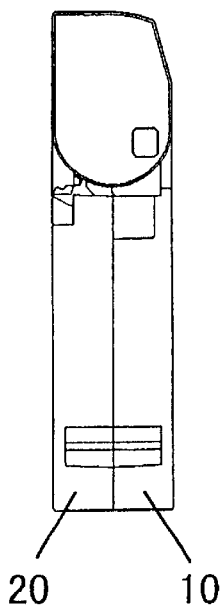
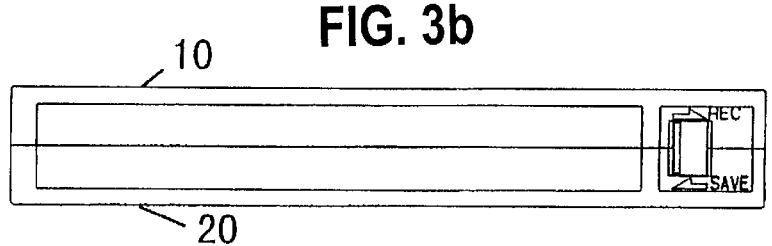
FIG. 3b

CARTRIDGE

BACKGROUND OF THE INVENTION

1. Field of the Invention

This invention relates to a joint structure for upper and lower casings of a two-part housing within which a tape medium or disk medium is enclosed.

2. Prior Art

Most of existing tape cartridge housings or cartridges have a housing or enclosure formed by upper and lower half casings tightened together along the mating faces of their sidewalls to provide a space in which a tape medium such as magnetic tape is accommodated. With a cartridge of the type described, the upper and lower casings are tightened together using tapping bosses formed at the four corners (or somewhere else, as the case may be). For example, Japanese Utility Model Application Kokoku No. 61-2805 introduces a cartridge in which the upper and lower halves of the housing have tapping bosses formed on opposing faces on the inner side and the two halves are joined together by setscrews inserted into throughholes of the bosses in one half casing and farther into corresponding tapping holes of the bosses in the other casing.

FIG. 1 gives outward views of a conventional cartridge and FIG. 2 shows relations between tapping bosses and the surrounding wall. In FIG. 1, (a) is a top view, (b) is a back view, (c) is a bottom view, and (d) is a left side view. The cartridge includes a housing which comprises an upper casing 100 and a lower casing 200 which are put together along the mating faces of their sidewalls and are joined with screws at five tapping parts 300, i.e., at the four corners and at a frontal, central point. FIG. 2 illustrates the structure of one of the tapping parts 300. A boss 110 extends downwardly from upper casing 100 toward lower casing 200, while a boss 220 extends upwardly from the lower casing toward the upper casing, and the two bosses are tightened together by means of a tapping screw 150.

The tendency toward smaller cartridges has necessitated reduction in the diameter of tapping bosses. Thickness of radiant ribs in the housing is limited to prevent shrinkage cavity at the time of molding. The lengths of the radiant ribs formed as reinforcements on the inner surfaces of the top and bottom walls that constitute the major planar surfaces of the upper and lower casings, are also restricted by the space requirement of the recording medium held within the housing. Consequently, the mechanical strength of the top and bottom walls is rather low. Under such circumstances, it has become increasingly difficult, when tightening the upper and lower casings together by screws, to join them by contacting only their tapping parts.

To be concrete, when the screw shown in FIG. 2(a) is tightened securely or to excess, bosses 110, 220 of the tapping part 300 fail to resist the force and are crushed at the mating ends as indicated in FIG. 2(b). As a consequence, the housing warps on the main planar surfaces toward their mechanically weak regions (in the case of lower casing 200, the regions around the holes through which drive shafts of a recorder are to be inserted, or the hatched regions, in FIG. 1(c), and in the case of upper casting 100, the corresponding regions). The sidewalls of the upper and lower casings are likewise in contact, but their contact area is large enough to resist crushing or deformation. The warp produces a gap as indicated in FIG. 1(b) or 1(d), deteriorating the configuration accuracy of the cartridge, marring the appearance, and impairing the dust-tightness of the housing.

The present invention is aimed at preventing the deformation of the major planar surfaces of the two-part housing of a cartridge and precluding the formation of any gap between the mating parts of its sidewalls.

BRIEF SUMMARY OF THE INVENTION

The present invention solves the afore-described problems of the prior art by providing a cartridge including a housing which holds a tape medium or disk medium therein, said housing being composed of upper and lower casings which are joined with screws in bosses formed at the four corners, characterized in that the bosses in at least one of the upper and lower casings have ends with partially different heights each so that, when the upper and lower casings are joined, their bosses come in contact with one another before the sidewalls of the casings are mated.

The bosses are bosses for tapping and the portions of their ends directed to mechanically weak regions of the housing, or normally directed toward the center of the housing, are protruded.

With the construction according to the present invention, the force with which each pair of tapping bosses are fastened with a screw acts on and crushes the protruded portion of one tapping boss, but the restoring force is strong enough to resist warping of the major planar surfaces of the housing. Consequently, the major planar surfaces are leveled with no warp throughout, while the sidewalls of the upper and lower casings are uniformly mated, leaving no gap whatever in between.

BRIEF EXPLANATION OF THE DRAWINGS

FIG. 3 shows the outward appearance of a cartridge embodying the present invention, (a) being a top view, (b) a back view, and (c) a left side view;

DESCRIPTION OF THE PREFERRED EMBODIMENTS

The present invention will be described in more detail below with reference to the accompanying drawings showing some embodiments thereof.

First Embodiment

Figure 1D:
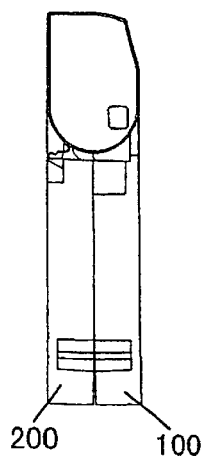
FIG. 1 shows the outward appearance of a conventional cartridge, (a) being a top view, (b) a back view, (c) a bottom view, and (d) a left side view.
Figure 1A:
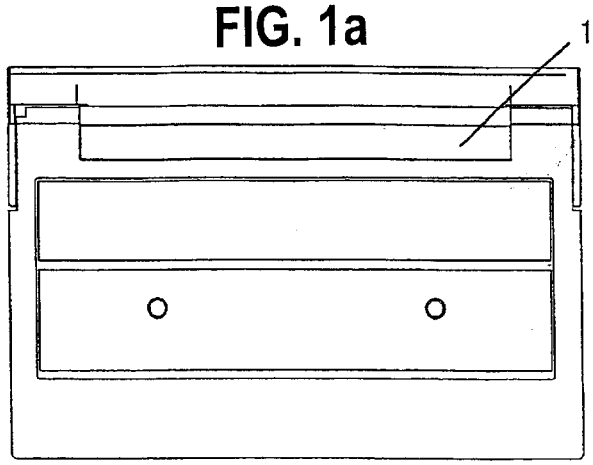
Figure 1B:
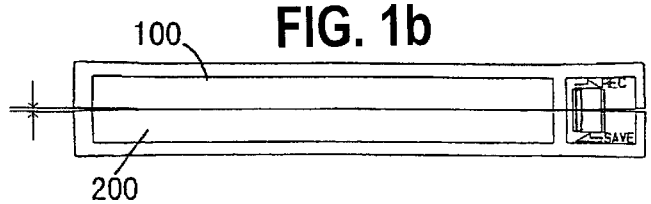
Figure 1C:
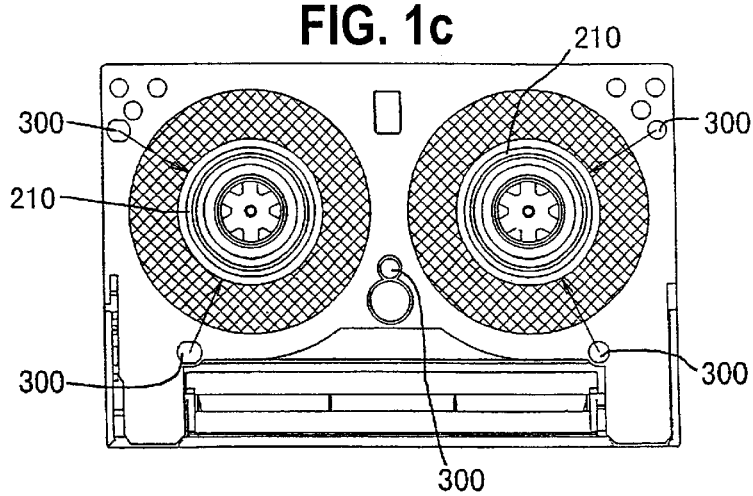
Figure 2A:
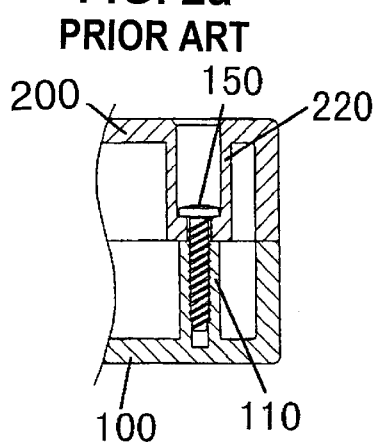
FIG. 2 shows tapping bosses in a conventional cartridge housing, (a) being a fragmentary cross sectional view in an early stage of screw tightening and (b) a similar view after tightening.
Figure 2B:
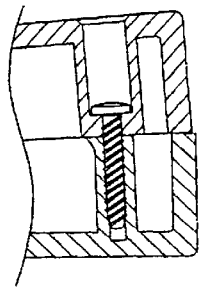
Figure 4:
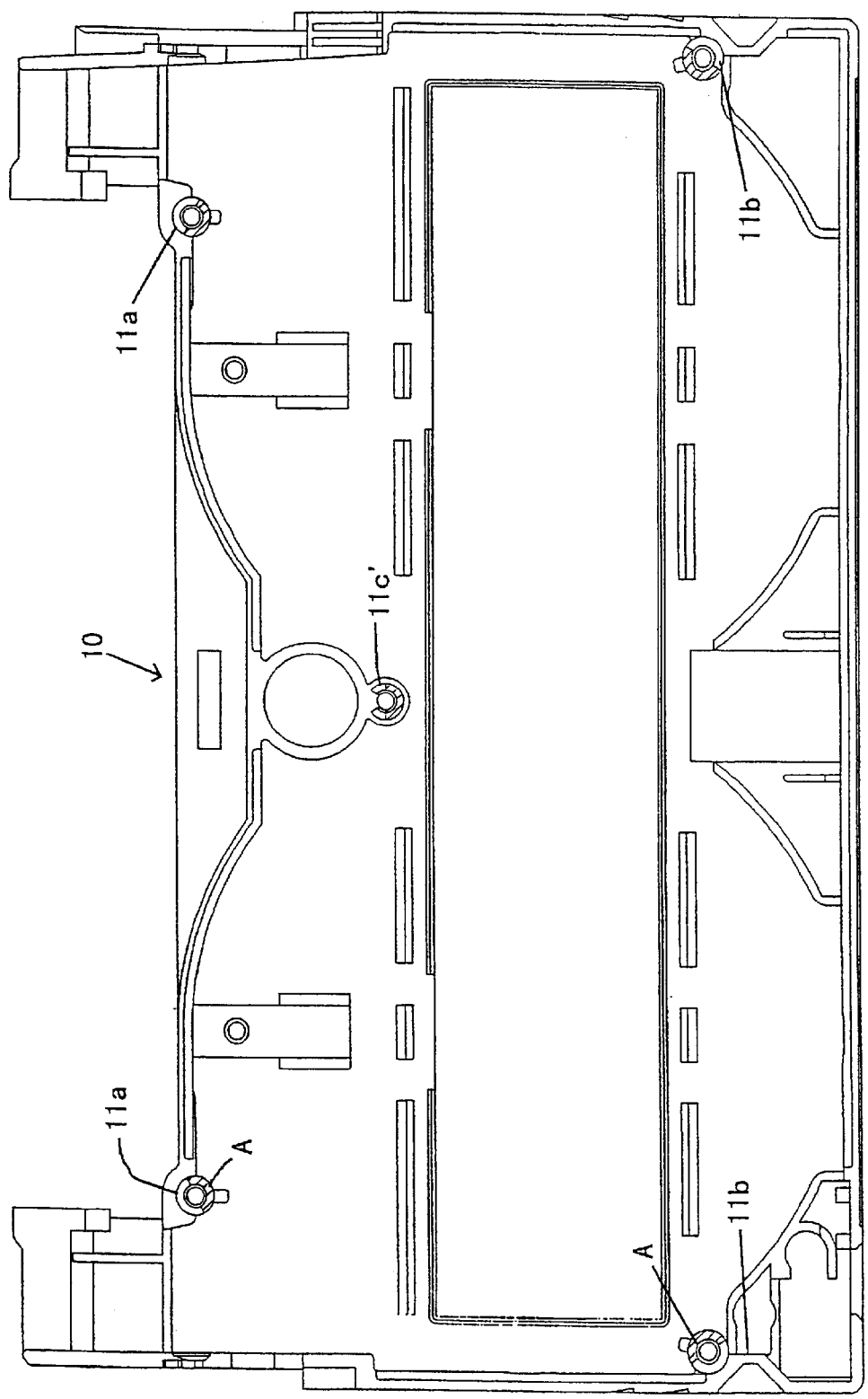
FIG. 4 is a plan view of the interior of the upper casing of a cartridge embodying the invention.
Figure 5A:
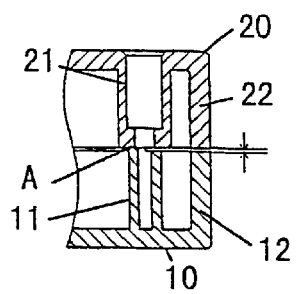
FIG. 5 gives fragmentary sectional views sequentially illustrating how tapping progresses in an embodiment of the invention, (a) being a view before tapping, (b) when a screw is tightened to begin applying force to the mating ends of tapping bosses of the upper and lower casings, (c) when further tightening brings sidewalls into contact, and (d) when tapping has been concluded.
Figure 5B:
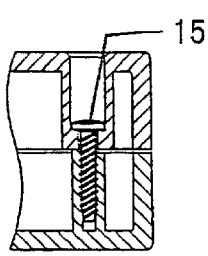
Figure 5C:
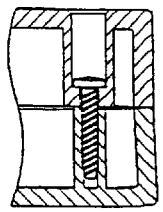
Figure 5D:
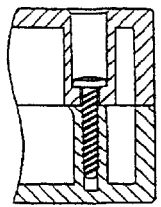

In conjunction with FIGS. 3 to 5, the invention will be described as applied to a tape cartridge holding an 8 mm-wide magnetic tape. The tape cartridge includes a housing composed of an upper and a lower casings 10, 20. The two casings 10, 20 are joined with screws tightened at five points, i.e., at the four corners and a frontal, central point. FIG. 4 shows the interior of the upper casing. Lower casing 20 has a construction similar to a counterpart of the prior art.

Referring to FIGS. 4 and 5, upper casing 10 has tapping bosses 11a formed at two points in the frontal part, tapping bosses 11b at two points in the rear part, and one tapping boss 11c in the frontal, central part. These tapping bosses have a hatched portion A each, accounting for about a half (180 deg.) of the end face of each cylindrical boss, as protruding from the rest of the boss end in contact with a corresponding tapping boss of the upper casing. The area of the protruding portion may be suitably chosen depending on the diameters of the mating bosses. The protrusion A faces the direction toward a drive shaft insertion hole as indicated in FIG. 1. In general the direction is toward the mechanically weak regions of the upper and lower casings, practically opposite to the sidewall 12 that mates with the upper surface of the side wall 22 of lower casing 20. The end of tapping boss 21 of lower casing 20 is flat as is the counterpart of the prior art.

The operation of the invention with the above embodiment will now be explained with reference to FIG. 5.

(a) When upper and lower casings 10, 20 are superposed, the protrusion A of tapping boss 11 of upper casing 10 is in contact with the end of tapping boss 21 of lower casing 20. At this point there is a gap between the sidewalls 12, 22 of upper and lower casings 10, 20.

(b) As a screw is put in and tightened, increasing force is applied to the contacting portions of tapping bosses 11, 21. Then a force is produced whereby the portions of tapping bosses not in contact yet are brought into contact (or the bosses are urged to bend leftward as viewed).

(c) However, owing to the screw put in, the tapping bosses can scarcely bend, and accordingly the casings are deformed so that sidewalls 12, 22 come in contact.

(d) Sidewalls 12, 22 having come in contact, the strong walls enable the portion A of tapping boss 11 to collapse, bringing the tapping bosses and sidewalls respectively into intimate contact.

In the tape cartridge as an embodiment of the invention, portions A with a height of 0.1 to 0.15 mm gave good tapping strength and imparted favorable shape quality to the housing.

The height may be suitably chosen depending on the dimensions of cartridges.

Second Embodiment

Figure 6:
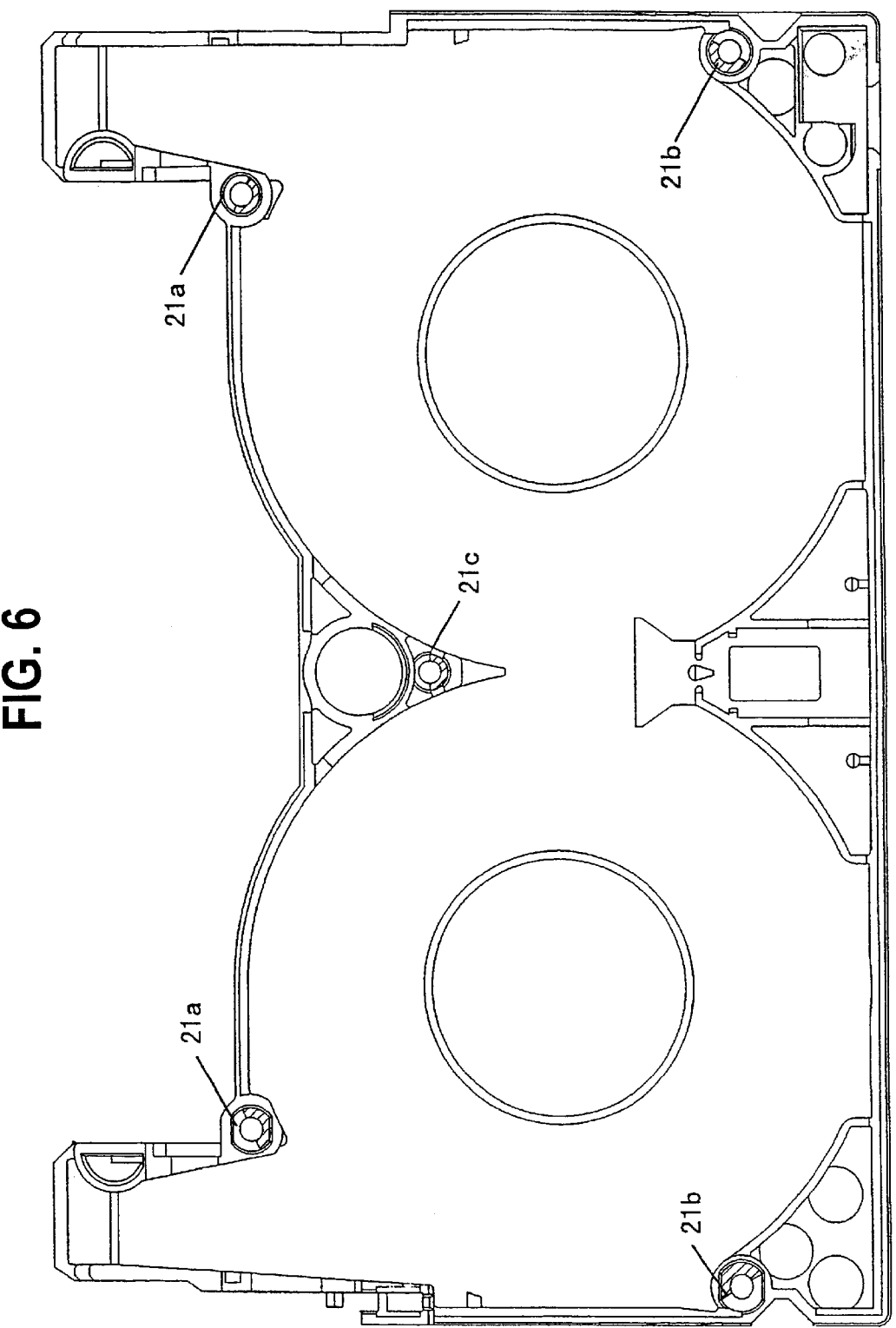
FIG. 6 is a plan view of the interior of the lower casing of another embodiment of the invention.

FIG. 6 illustrates another embodiment of the invention. While the first embodiment used an upper casing 10 with tapping bosses 11 having a protrusion each, this embodiment has a similar construction in a lower casing 20 instead. In the second embodiment, tapping bosses are formed at two points 21a in the frontal part of lower casing 20, at two points 21b in the rear part, and at one point 21c in the frontal, central part. Hatched portions A of the tapping bosses are protrusions from the ends of the bosses that mate with the bosses of the lower casing. Each protrusion A is directed toward a drive shaft insertion hole. In general the direction is toward the mechanically weak region of the upper or lower casing. In the illustrated embodiment the ends of tapping bosses of upper casing 20 is flat as usual.

Although the protrusions A at the ends of tapping bosses in the first and second embodiments are shaped like steps as in FIG. 5, they may be sloped instead.

As has been described above, the present invention provides a cartridge of high dimensional accuracy with little possibility of deformation, achieving an effect of producing a tight joint with no gap in the sidewalls of the upper and lower casings of the cartridge housing.

What is claimed is:

1. A cartridge including a housing which holds a tape medium or disk medium therein, said housing being composed of upper and lower casings which are joined with screws in bosses formed at the four corners thereof, characterized in that the bosses in at least one of the upper and lower casings have ends with partially different heights each so that, when the upper and lower casings are joined, the bosses thereof come in contact with one another before the sidewalls of the casings are mated, and wherein the force with which a pair of tapping bosses are fastened with a screw acts on and crushes the protruded portion of one tapping boss.

2. The cartridge of claim 1, wherein the bosses are bosses for tapping and the portions of the ends thereof directed to mechanically weak regions of the housing are protruded.

3. The cartridge of claim 2, wherein the bosses have end portions protruded in the direction toward the center of the housing.

4. The cartridge of claim 1, wherein the pair of bosses are bosses for tapping and the protruding portion of the end of said boss having the protruding portion protrudes in a direction toward a mechanically weak region of the housing.

5. The cartridge of claim 4, wherein the boss having a protruded portion has the protruded portion protruding in a direction toward the center of the housing.

6. A cartridge including a housing which holds a tape medium or disk medium therein, said housing being composed of upper and lower casings which are joined with screws in bosses, characterized in that at least one pair of mating bosses in said upper and lower casings includes a boss having an end with a partially different height to provide a protruded portion so that, when the upper and lower casings are joined, the boss having the protruded portion comes in contact with its mating boss before the sidewalls of the casings are mated, and wherein the force with which said pair of bosses are fastened with a screw, acts on and crushes the protruded portion of said boss.

7. The cartridge of claim 6, wherein bosses having protruded portions are formed at four corners of the cartridge.

8. The cartridge of claim 7, wherein each pair of tapping bosses includes a tapping boss having an end with a protruded position.

* * * * *